United States Patent [19]

Clinefelter et al.

[11] 4,446,903
[45] May 8, 1984

[54] NON-PNEUMATIC TIRE

[75] Inventors: Richard L. Clinefelter, Littleton, Colo.; Larry R. Bradford, Woodridge, Ill.

[73] Assignee: The Gates Rubber Company, Denver, Colo.

[21] Appl. No.: 929,399

[22] Filed: Jul. 31, 1978

[51] Int. Cl.³ .............................................. B60C 7/00
[52] U.S. Cl. .................................................... 152/323
[58] Field of Search ............... 152/323, 187, 185.1, 152/151, 246; 301/63 PW

[56] References Cited

U.S. PATENT DOCUMENTS

| 637,717 | 11/1899 | DuBois | 152/323 |
|---|---|---|---|
| 2,525,196 | 10/1950 | Bacon | 152/323 |
| 2,665,521 | 1/1954 | Ford | 152/323 |
| 2,701,971 | 2/1955 | Carter et al. | 152/323 |
| 2,764,213 | 9/1956 | Simpson | 152/323 |
| 2,906,312 | 9/1959 | Freelander | 152/323 |
| 3,452,798 | 7/1969 | Ravreby | 152/323 |
| 3,646,983 | 3/1972 | Van Lieshound | 152/323 |
| 3,957,101 | 5/1976 | Ippen et al. | 152/323 |
| 4,127,166 | 11/1978 | Wyman | 152/323 |

Primary Examiner—Richard A. Bertsch
Attorney, Agent, or Firm—C. H. Castleman, Jr.; H. W. Oberg, Jr.; Raymond Fink

[57] ABSTRACT

A non-pneumatic tire for a wheelchair or other wheeled apparatus includes an endless integrally molded solid core rubber tire with a tensile member embedded in the tire to minimize chance of roll-off of the tire from an associated rim. A method for producing the tire is disclosed.

23 Claims, 6 Drawing Figures

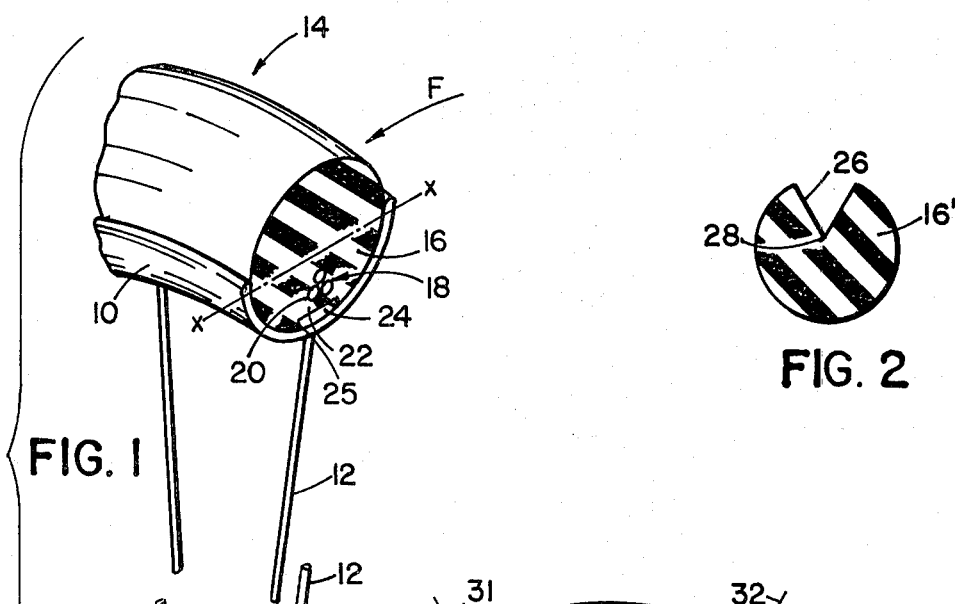
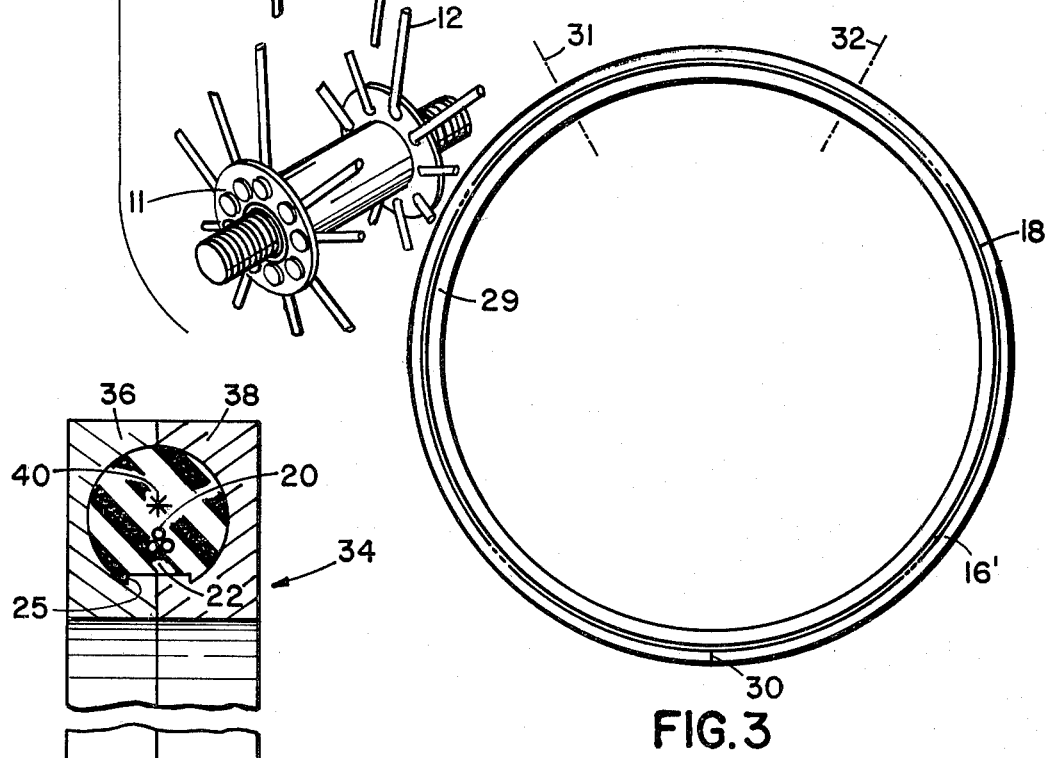

NON-PNEUMATIC TIRE

BACKGROUND OF THE INVENTION

This invention relates to non-pneumatic tires for wheeled apparatus such as wheelchairs, and particularly to an endless integrally molded tire for such purposes.

Wheelchair tires have conventionally been produced from hollow cylindrical elastomeric extrusions. The pre-cured extrusion is cut to length, fastened into a circle using a device similar to a hose barb, then machine stretched onto the rim. In a similar technique, a wire is loosely inserted in the hollow axial passage of the extrusion, and the extrusion and internal wire fastened into a circle by twisting or clenching the ends of the wire together, producing a joint at the abutting ends of the extrusion.

The above prior art wheelchair tires have suffered from certain problems. A primary one is the relative ease with which the tire assembly is susceptible to rolling off the rim from side loading encountered when turning the wheelchair sharply. This roll-off tendency is believed attributable at least in part to the joint formed between abutting ends of the extrusion, and the fact that the wire insert has freedom of movement inside the extrusion, and is subject to breaking. Another problem is encountered by the wheelchair user when his wheelchair tire needs replacement. It is generally necessary to have a new tire installed on the wheelchair using special machinery, oftentimes requiring transport of the wheelchair back to the factory or repair center.

In another prior wheelchair tire configuration, an endless extrusion surrounds an embedded or partially embedded coil spring located at the internal diameter of the tire and whose ends are interconnected. The tire may be snapped on and off an associated rim by hand. The coil spring, while aiding mounting and removal of the tire from the rim, will undergo unacceptably high elongation under side loading and therefore resistance to roll-off is less than desired.

It is a primary object of the present invention to provide a snap-on endless integrally molded wheelchair tire which is resistant to roll-off even under elevated side loading forces, and which can be easily replaced in the field.

SUMMARY OF THE INVENTION

Briefly described, in one aspect the invention pertains to a non-pneumatic tire for wheelchair or other wheeled apparatus comprising an integrally molded endless elastomeric solid core element, and a tensile member embedded in the interior of the solid core element and extending continuously throughout such interior.

In another aspect, the invention pertains to a method of making an endless, integrally molded wheelchair tire or tire for other wheeled apparatus including the steps of (1) forming a length of vulcanizable elastomeric material having a continuous longitudinal notch in one side thereof; (2) positioning the length of material circumferentially about an endless fixture with the notch to the outside, and with the ends of the length in substantial abutting relationship; (3) placing a tensile member in the notch with the tensile member extending continuously about such notch, to define a tire preform; and (4) inserting the tire preform into a mold cavity and mold curing the preform to form an endless, integrally molded tire having a tensile member embedded therein.

BRIEF DESCRIPTION OF THE DRAWINGS

Certain preferred embodiments of the invention will be described with reference to the accompanying drawings, wherein like numerals designate like parts in the several figures, and in which:

FIG. 1 is a partial perspective view of an endless tire and rim assembly for the rear wheel of a wheelchair according to the invention;

FIG. 2 is a cross-sectional view of an extrusion used in a preliminary step in the production of the tire of the invention;

FIG. 3 is a view illustrating a secondary stage of building up the tire;

FIG. 4 depicts in cross section a partial view of a mold assembly used in the production of the tire;

FIG. 5 illustrates an alternative embodiment of the tire of the invention in cross section; and FIG. 6 illustrates another alternative embodiment of the tire of the invention shown in cross section.

PREFERRED EMBODIMENTS OF THE INVENTION

The invention will be described in particular with regard to a tire for the rear (large) wheel of a wheelchair, and its method of production, however it will be understood that the invention also encompasses wheelchair front tires, and generally applies to non-pneumatic tires for various wheeled apparatus, such as carts, tricycles and other toys, hospital equipment, and horticultural equipment, such as lawn mowers and the like.

Referring first to FIG. 1, there is shown a segmental portion of a circular wheelchair rim 10, supported by a plurality of radially extending spokes 12 leading to a central hub 11. The spokes are retained on the rim by nuts (not shown) which protrude into the seating area of the rim. The channel-shaped rim is substantially semi-circular in cross section, as shown.

Within the rim is seated the generally toroidal shaped tire 14 of the invention. The tire is formed of a solid core elastomeric element 16 of generally circular cross-sectional shape. The elastomeric solid core element is endless and integrally molded, and free from end-to-end joints along the circumference of the tire. Although not narrowly critical, it is preferred that the tire form a substantially conjugate fit with the adjacent sidewall surfaces of rim 10.

Tensile member or section 18 is embedded within the interior of the solid core element and extends continuously through the interior of the element in a circular fashion. As shown, the tensile section may be formed of a plurality of filaments, strands or cord members 20 formed of a strain resisting tensile member, of textile or other material of sufficiently high modulus to withstand the tension forces encountered in operation together with a degree of extensibility to aid in mounting of the tire, to thereby hold the tire on the rim and resist rolling off while permitting ease of installation. Various tensile member materials may be employed, including without limitation polyester and nylon cord, oriented Hytrel (trademark identifying certain polyester thermoplastic elastomer compounds), cellulosic fibers such as rayon, and the like. In certain applications substantially non-extensible material such as fiber glass or wire filament may be used, although in other applications and depending upon placement of the tensile section, a degree of stretch of the tensile member may be desirable to assist in mounting the tire on the rim. That degree of stretch, however, may in certain instances be provided solely by the compression of the elastomeric body portion 22 located intermediate the tensile section and the most radial inward surface of the tire element.

It is important that the aforementioned tensile section 18 be embedded in the elastomeric matrix. In this manner, at least a portion of the outer surface of the individual tensile members is in intimate and direct contact with the elastomeric material, resulting in a mechanical captivation or bond, and/or chemical bond depending upon the relative nature of the materials and whether any bonding agent or treatment is present. In this respect the tensile member should be substantially spaced away from the radial innermost portion of the tire via compression layer 22.

Although the cross section of the core element may be substantially round (as shown in phantom in the alternative embodiments of FIGS. 5 and 6), it is preferred that the core element be provided with a continuous or semi-continuous notch 24 molded into the tire. The notch not only allows seating on the rim without interference with the aforementioned spoke retention nuts, but also may provide a resistance to rolling force F, tending to roll the tire element off the rim. In this respect the sides 25 of the notch surface encounter the aforementioned nuts, which lie along the inner surface of the rim, and limit further rolling movement. This presumes a rolling action of the tire within the rim, as opposed to a pivoting action, which might occur depending upon the relative coefficients of friction and other factors.

In the alternative shown in FIG. 5, a single continuous tensile member 18' is embedded in the elastomeric matrix 16 of the tire. This tensile member may be formed of a rod of plastic or high modulus rubber stock whose ends are fastened together, such as by heat fusing, curing to effect cross-linking, or with the aid of a mechanical fastening device. Examples of suitable materials include polyester elastomer, polyethylene or polyurethane rod.

Although not narrowly critical, it is highly preferred that the tensile section 18 lie between the approximate cross centerline X—X of the toroidal tire element and the radial innermost surface or notch 24 of the tire. Most preferably, in relation to cross centerline X—X (which is normal to the plane of the tire and passes through the approximate center or centroid of the element), the tensile section center is positioned at least 15 percent of the radial distance Y (see FIG. 5) below the centerline X—X, and more preferably at least about 40 percent of the radial distance Y below such centerline, and in either case at least about 10 percent of the radial distance Y above the radial innermost portion (24) of the tire.

However, in certain applications and depending upon the shape of the tire, it is satisfactory if the tensile section, such as 18" shown in FIG. 6, be at approximately the centroid of the element, or slightly thereabove. The important factor is to provide sufficient resistive tension to a rolling off force to offer sufficient resistance to preclude a total unseating of the tire from the rim. It may be tolerable if the tire deflects or lifts as long as it automatically snaps back into the seating position.

The embodiment of FIG. 6 employs an asymmetrical tire shape to further combat the problem of wheelchair tire roll-off. In essence, by reducing the radial extent Z of the core element radially outwardly of centerline X—X, to be preferably less than the inward radial extent Y of the core element, the moment arm length and tendency for the tire to roll-off is reduced.

The tire of FIG. 1 is produced by building up the constituent materials to form a preform, followed by mold forming the preform, utilizing heat and/or pressure as required. In the preferred method as partly illustrated by reference to FIGS. 2–4, a continuous length of vulcanizable elastomeric material 16' may be extruded, or molded to a particular length, with a notch or other indentation 26 being provided in one side of the extrusion. The desired length of notched material is then positioned circumferentially about endless fixture 29, which may be of the same cross-sectional shape as rim 10, for instance, with the ends of the length of elastomeric material brought into abutting relationship at joint 30. Notch 26 is positioned away from the fixture so that it lies along the outer circumference.

A plurality of turns of tensile cord 20 are then wrapped about the elastomeric element so that the tensile section 18 (shown in phantom in FIG. 3) is positioned along the base or trough 28 of the notch, which preferably lies above the center of the element. It has been found satisfactory to wrap three turns of cord 20 about the notched elastomeric element by starting at location 31, substantially opposite joint 30, and proceeding clockwise for three turns and terminating at an overlap position 32, also opposite joint 30. In certain cases, a single turn of cord will suffice, preferably with an overlap provided.

The preform consisting of the endless rod-like elastomeric material, with radial outward notch and tensile member disposed therein, may then be flipped off or otherwise removed from fixture 29, principally because of the elasticity of the elastomeric stock and the positioning of the tensile member toward the outer portion of the preform. The preform is then inserted in mold 34.

Mold 34 comprises identical mold halves 36, 38, within which is positioned the preform blank. The preform is then mold formed in mold 34 with the aid of heat and pressure so that the elastomeric material softens and conforms to the shape of the mold surface (platens, sprue holes and other common features of the mold have been omitted from the drawings.) With the preferred use of a heat shrinkable tensile member 20, such as polyester cord, the heating encountered during the molding operation causes the tensile section to be displaced from its initial position 40, corresponding to trough 28 of the preform, radially inwardly to the final location shown in FIG. 4. This radial displacement may vary throughout the tire depending upon thermal shrinkage characteristics of the tensile and elastomeric body materials and other factors.

Upon demolding, the finished endless, integrally molded tire with fully embedded tensile member is ready for mounting on rim 10, and this may be accomplished simply by stretching the tire about the rim and snapping it into place, much like mounting an automobile tire onto its rim. A hand tool may be used as an aid depending upon the construction.

The elastomeric materials used for the tire should be selected or compounded to fit the particular application, addressing such factors as resilience, durometer and compression set. Various natural and synthetic rubbers, such as polybutadiene, SBR, and polyisoprene and various blends are suitable.

It is understood that the invention is capable of a variety of modifications and variations which will become apparent to those skilled in the art upon a reading of the present specification. The invention is intended to be limited in scope only according to the terms and equivalents in the appended claims.

What is claimed is:

1. A non-pneumatic tire for a wheelchair or other wheeled apparatus, comprising: an integrally molded endless non-jointed elastomeric solid core element; and at least one turn of a strain-resisting tensile member embedded in the interior of the solid core element and spaced substantially from both the radial innermost extent of and sidewalls of the tire, and extending continuously throughout such interior, and the tensile member being sufficiently extensible to permit snap-on mounting of the tire onto a channel-shaped rim.

2. The tire of claim 1 wherein the tensile member is positioned more closely to the radial inward surface of the tire than to the circumferential (radial) outer surface of the tire.

3. The tire of claim 1 wherein the cross section of the tire is substantially circular, and a slot is positioned chordally along the radial inner surface of the tire.

4. The tire of claim 1 wherein the cross section of the tire is asymmetrical with respect to a line drawn substantially through the center of the solid core element normal to a radial line of the tire.

5. The tire of claim 4 wherein the radial extent of the core element radially inwardly of said line is greater than the radial extent of the core element radially outwardly of said line.

6. The tire of claim 1 wherein the tensile member is formed of a plurality of turns of tensile cord in closely adjacent relationship.

7. The combination of a wheelchair wheel with the tire of claim 1 mounted thereon.

8. The tire of claim 1 wherein the tensile member is located generally at the centroid of the cross section of the tire.

9. A one-piece wheelchair tire comprising: a generally circular cross-sectioned integrally molded non-jointed endless elastomeric solid core element; a slot formed at the radial inward surface of the core element; and a continuous strain-resisting tensile member embedded in the core element intermediate the slot and approximate center of the core element, whereby the tire may be slightly stretched for installation onto a rim, while in use resisting roll-off encountered under side loading of the rim mounted tire.

10. The wheelchair tire of claim 9 wherein the tensile member is integral with the core element and forms a bond with the elastomeric material of the core element.

11. The wheelchair tire of claim 9 wherein the tensile member is positioned substantially adjacent the slot near the radial inward surface of the tire.

12. The wheelchair tire of claim 11 wherein the slot is mold formed into the core element.

13. The wheelchair tire of claim 9 wherein the tensile member is formed of an endless plastic or rubber rod reinforcement, whose ends are attached together.

14. The wheelchair tire of claim 9 in combination with an associated wheel having a hub, a rim, spokes connecting the rim concentrically about the hub, and means disposed in the slot of the tire mounting the spokes to the rim.

15. A non-pneumatic tire assembly for a wheelchair or other wheeled apparatus, comprising:
 a channel-shaped rim having a radial innermost portion and lateral upstanding sidewall surfaces terminating in outer edges; and
 a tire mounted on the rim comprising:
  an integrally molded endless non-jointed elastomeric solid core element seated between the sidewall surfaces; and
  at least one turn of a strain-resisting tensile member embedded in the interior of the solid core element and spaced substantially from both the radial innermost portion of the rim and said sidewall surfaces, and extending continuously throughout such interior;
  said tensile member being sufficiently extensible to permit snap-on mounting, and demounting of the tire from the rim while resisting roll-off while in assembled use on the wheelchair or other wheeled apparatus.

16. The tire assembly of claim 15 wherein at least a portion of the strain-resisting tensile member is positioned radially inwardly from a straight line connecting the respective outer edges of the sidewall rim surfaces.

17. The tire assembly of claim 16 wherein the tensile member is in the form of a plurality of wound textile strands, filaments or cords formed in a closely spaced fiber bundle.

18. The tire assembly of claim 15 wherein a slot is positioned chordally at the radial innermost portion of the tire to form, with the rim, an annular void.

19. A one-piece solid core tire adapted to be snapped on to a channel-shaped rim member, for use in wheeled apparatus comprising:
 an integrally molded endless and non-jointed elastomeric solid core element of toroidal shape; and
 a reinforcement integrally embedded interiorly within the solid core element and located near the center of the element cross section, extending throughout the interior of the element and spaced substantially from the lateral sides of the tire by intervening elastomeric material.

20. The tire of claim 19 wherein the reinforcement is formed of a plurality of helical turns of a strain-resisting tensile member positioned in adjacent proximity.

21. The tire of claim 20 wherein the reinforcement is bonded to the elastomeric material of the core element.

22. The tire of claim 19 in combination with an associated one-piece rim having said channel shape with a radial innermost portion and lateral upstanding sidewall surfaces terminating in outer edges; said tire, in the form of a single endless member being mounted on the rim so that the reinforcement is positioned radially below a straight line joining respective outer edges of the sidewall surfaces and is spaced farther from the sidewall surfaces than from the radial innermost portion of the rim.

23. The tire of claim 22 wherein the reinforcement member is in the form of a plurality of helically wound textile strands, filaments or cords formed in a closely spaced fiber bundle.

* * * * *